United States Patent

Muschallik et al.

[19]

[11] Patent Number: 6,088,327
[45] Date of Patent: Jul. 11, 2000

[54] METHOD AND CIRCUIT ARRANGEMENT FOR IMPROVING CARRIER SEPARATION FOR THE TRANSMISSION OF OFDM SIGNALS

[75] Inventors: Claus Muschallik, Villingen-Schwenningen; Veit Armbruster, St. Georgen, both of Germany

[73] Assignee: Deutsche Thomson-Brandt GmbH, Villingen-Schwenningen, Germany

[21] Appl. No.: 08/952,436

[22] PCT Filed: May 23, 1996

[86] PCT No.: PCT/EP96/02209

§ 371 Date: Nov. 17, 1997

§ 102(e) Date: Nov. 17, 1997

[87] PCT Pub. No.: WO96/41458

PCT Pub. Date: Dec. 19, 1996

[30] Foreign Application Priority Data

Jun. 7, 1995 [DE] Germany ............... 195 20 353

[51] Int. Cl.[7] .................................................. H04L 27/26
[52] U.S. Cl. .................. 370/210; 370/203; 370/208; 375/354; 375/355
[58] Field of Search ............... 370/203, 208, 370/210, 206, 480, 484, 497; 375/260, 354, 355

[56] References Cited

U.S. PATENT DOCUMENTS 4,794,556  12/1988  Rader ................................ 708/320
5,357,502  10/1994  Castelain et al. .................... 370/210
5,396,489   3/1995  Harrison ............................. 370/210
5,416,767   5/1995  Koppelaar et al. ................... 370/210
5,537,435   7/1996  Carney et al. ....................... 375/219

FOREIGN PATENT DOCUMENTS

0 441 732 A1  8/1991  European Pat. Off. .
0 562 868 A2  9/1993  European Pat. Off. .
0 613 267 A2  8/1994  European Pat. Off. .

*Primary Examiner*—Hassan Kizou
*Assistant Examiner*—Saba Tsegaye
*Attorney, Agent, or Firm*—Joseph S. Tripoli; Eric P. Herrmann; Ronald H. Kurdyla

[57] ABSTRACT

In the case of the OFDM method, a large number of modulated carriers are transmitted using frequency division multiplexing, a spectrum having a virtually rectangular shape being produced as a result of the large number of carriers. In order to separate the carriers from one another again in the receiver, a Fast-Fourier-Transformation is carried out, it then being possible to separate each carrier cleanly from the others provided the carriers are exactly orthogonal with respect to one another. The carrier orthogonality can, however, be disturbed by various causes. Furthermore, the wanted signal must be separated from the undesired adjacent channel signals by analog or digital filtering in the receiver. In order to improve carrier and channel separation, the selectivity of the FFT filtering can be increased by enlarging the number of FFT components. However, this normally leads to an undesirably sharp increase in the computation complexity. The refinement according to the invention of the time window which is used for the FFT and the oversampling before the FFT make it possible, however, to dispense with calculation of some of the coefficients.

8 Claims, 7 Drawing Sheets

METHOD AND CIRCUIT ARRANGEMENT FOR IMPROVING CARRIER SEPARATION FOR THE TRANSMISSION OF OFDM SIGNALS

The invention relates to a method and a circuit arrangement for improving reception when digital signals are being transmitted.

PRIOR ART

In the case of the OFDM method (Orthogonal Frequency Division Multiplexing), one carrier is not used for each programme, but a large number of modulated carriers which are transmitted using frequency division multiplexing. The type of modulation may be, for example, QPSK, 64 QAM or else another digital type of modulation. The frequencies of the N carriers are at equidistant intervals $f_{tr}$ and are selected in such a manner that they form an orthogonal function system. The large number of carriers in this case results in a spectrum having a virtually rectangular shape, so that the OFDM signal has a constant power density in the band which is being used, similar to band-limited white noise.

The programme signals are decomposed into symbols of duration $T_s = 1/f_{tr}$ and are distributed over the N different carrier frequencies. In this case, a guard interval of length $T_g$ is assigned to each OFDM symbol, in which guard interval a part of the symbol is repeated in order to make the signal insensitive to echoes.

In order to separate the carriers from one another again in the receiver, a Fast Fourier Transformation (FFT) of length N is carried out, it then being possible to separate each carrier cleanly from the others provided the carriers are exactly orthogonal with respect to one another.

However, the carrier orthogonality can be disturbed by various causes. A frequency error in the carrier or spreading of the carriers can thus occur as a result of phase noise. The orthogonality is also disturbed if frequency elements are present which are located between the carriers. This can be caused by white noise or harmonic interference whose frequency does not coincide with a carrier frequency.

Furthermore, the wanted signal must be separated from the undesired adjacent channel signals by analog or digital filtering in the receiver. If the wanted signal fills the entire channel as far as the band limits, then the small separation between two adjacent signals requires very steep filters for separation, which require a high level of system complexity. Cutting off a number of carriers at the band limits in order to increase the separation can overcome this only to a limited extent.

Integration of all the frequency elements (leakage effect of the FFT) is carried out in both cases, which integration can lead to a considerable increase in the interference in the respective OFDM receiver.

INVENTION

The invention is based on the object of specifying a method for improving reception when digital signals are being transmitted, by means of clean carrier and channel separation.

The invention is based on the further object of specifying a circuit arrangement for use of the method according to the invention.

In order to improve the separation of the N carriers, the selectivity of the FFT filtering can be increased by enlarging the number of FFT components. However, this normally leads to an undesirably severe increase in the computation complexity, since the length of the FFT and thus the number of calculated coefficients must be an integer multiple of N. The refinement according to the invention of the time window which is used for the FFT makes it possible, however, to dispense with calculation of some of the coefficients. Depending on the transmitted signal and the transmission conditions, the implementation of the window can in this case be adaptively matched to the transmission conditions, with the aid of an estimation of the channel characteristics.

The channel separation can be improved if the signal is oversampled in the receiver, before the FFT. The selection of the oversampling according to the invention now makes it possible to dispense with calculation of some of the coefficients in this case as well and to use relatively simple analog filtering since steep filtering is then no longer necessary.

In the case of the carrier and channel separation, the FFT can be carried out using the principle of reduction of the frequency band (decimation in frequency), so that only the first stage of an FFT need be calculated using all the coefficients. The other coefficients which are used are then calculated using a normal N-FFT. The increase in complexity for enlarged N is thus minimal.

In principle, the method according to the invention for improving reception when digital signals are being transmitted, the digital signals being decomposed into symbols of duration $T_s$ for transmission and a guard interval being assigned to each symbol, and these being distributed over N different carrier frequencies and the transmitted signal being subjected to Fourier transformation in a receiver, consists in that new symbols of duration $M_1*T_s$ are produced for the symbols and multiplication by time windows of duration $M_1*T_s$ is carried out during the Fourier transformation, after sampling of the signal, the length of the Fourier transformation being $M_1*N$ and being calculated by the Fourier transformation of each $M_1$th coefficient.

The symbols are preferably lengthened by the duration $T_v$, and lengthened symbols are thus produced, samples before and after the lengthened symbols are set to zero in order to produce the new symbols in this way, and the time windows are in each case formed from a Nyquist window and a region which is set to zero.

The number of samples which are set to zero is advantageously selected such that the duration of the new symbols is $2*T_s$, the Nyquist window has Nyquist points at $T_s/2$ and $3T_s/2$, the length of the Fourier transformation is $2*N$, and only every 2nd coefficient is calculated.

The new symbols are advantageously formed from the symbols and a part of the guard intervals.

It is particularly advantageous for the current maximum usable length of the guard intervals to be calculated in the receiver in order to enable length adaptation of those parts of the guard intervals which are used for formation of the new symbols.

In principle, the method according to the invention for improving reception when digital signals are being transmitted, in the case of which transmission is carried out into a number of channels, N carrier frequencies being used per channel and one of the channels being selected in a receiver, sampling of the signal and a Fourier transformation being carried out, consists in that $M_2*N$ samples are produced during the sampling, the length of the Fourier transformation is $M_2*N$ and the centre N coefficients are calculated by the Fourier transformation.

In principle, the circuit arrangement according to the invention for a method for improving reception when digital signals are being transmitted and in the case of which the transmitted signals are supplied to a first unit in which sampling of the signals and conversion into I/Q signals is carried out, frequency matching of the I/Q signals is carried out with the aid of a frequency mixing unit and the separation of the N carrier frequencies is carried out in a processor, consists in that new symbols of duration $M_1 * T_s$ are produced in the processor, windowing is carried out with time windows of duration $M_1 * T_s$, a Fourier transformation of length $M_1 * N$ is carried out and only every $M_1$th coefficient is calculated.

The current maximum usable length of the guard interval is advantageously determined by a detector unit, in order to produce the new symbols.

The first unit advantageously comprises an A/D converter and a digital filter.

In principle, the circuit arrangement according to the invention for a method for improving reception when digital signals are being transmitted according to, in the case of which circuit arrangement the transmitted signals are supplied to a first unit in which sampling of the signals and conversion into I/Q signals are carried out, frequency matching of the I/Q signals is carried out with the aid of a frequency mixing unit and the separation of the N carrier frequencies is carried out in a processor, consists in that the sampling rate is selected by means of a synchronization unit in such a manner that $M_2 * N$ samples are produced during the sampling, an FFT of length $M_2 * N$ is calculated in the processor, and only the centre M coefficients are calculated.

$M_1$ and $M_2$ are preferably natural numbers, in particular powers of 2.

DRAWINGS

Exemplary embodiments of the invention will be described with reference to the drawings, in which:

FIG. 1 shows an OFDM signal (A), a rectangular time window (B) and the associated coefficient spectrum (C), FIG. 3 shows an OFDM signal (A), a Nyquist time window (B) and the associated coefficient spectrum (C), FIG. 5 shows a comparison of the disturbances in a conventional FFT (A) and the FFT according to the invention (B)

EXEMPLARY EMBODIMENT

Figure 1A:
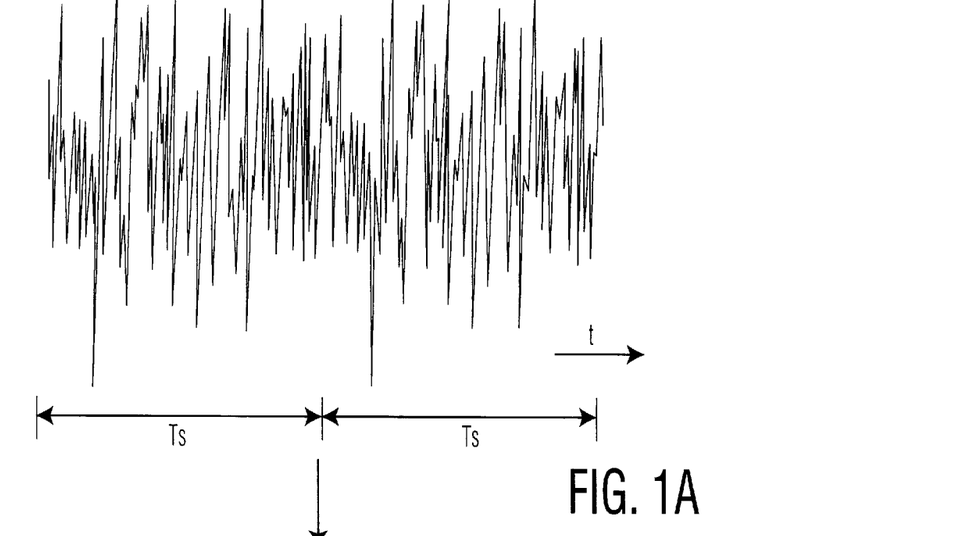
Figure 1B:
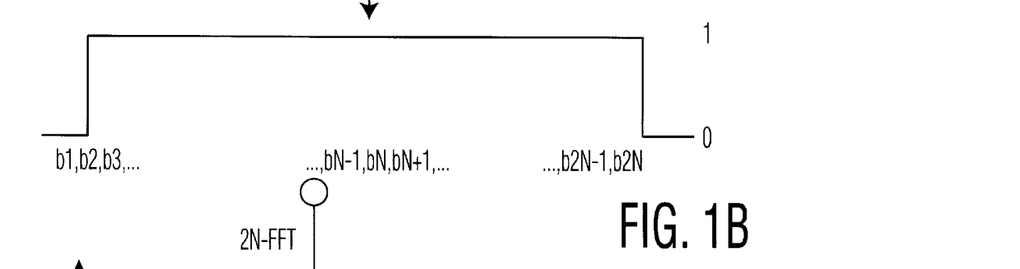
Figure 1C:
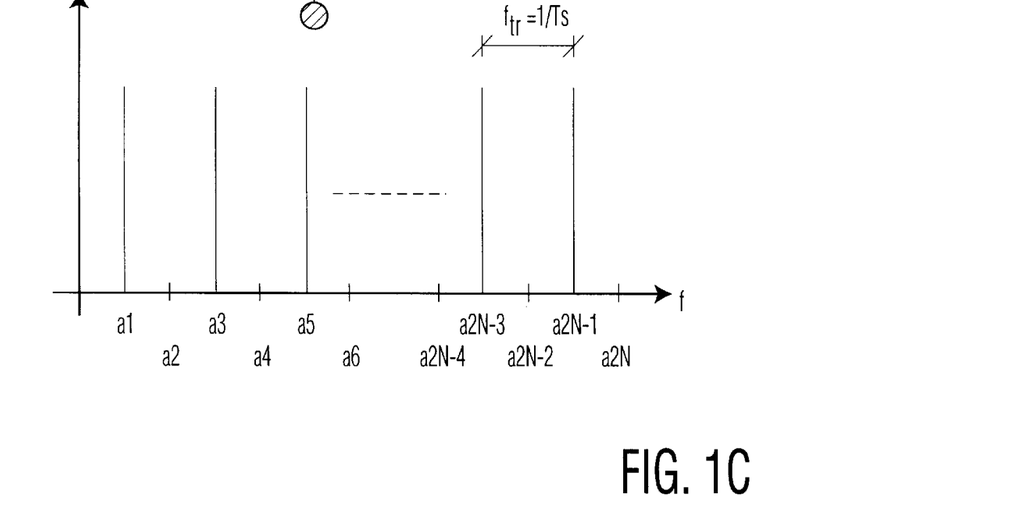

FIG. 1 shows a method according to the invention for improving carrier separation. In the time domain, the spectrum of the OFDM signal has an apparently noisy envelope, as illustrated in FIG. 1A. The duration of a symbol is now increased to twice the duration (or $2^n$-times) in the transmitter, for example by lengthening the guard interval. 2N sample $b_1, b_2, b_3 \ldots, b_{2N-1}, b_{2N}$ are now taken from this signal, the samples being multiplied in accordance with FIG. 1B by a time window in order to separate the individual symbols from one another. The rectangular time window in this case has a length of 2. Ts. Within this time, an FFT of length 2N calculates from the samples the 2N complex coefficients $a_1, a_2, a_3, \ldots, a_{2N-1}, a_{2N}$. These coefficients contain the information, which was modulated in the transmitter, from each individual carrier, only the coefficients $a_1, a_3, a_5, a_7 \ldots, a_{2N-1}$ of the 2N coefficients containing relevant information, as is shown in FIG. 1C. The remaining coefficients are not required, so that they need not be calculated.

Figure 2:
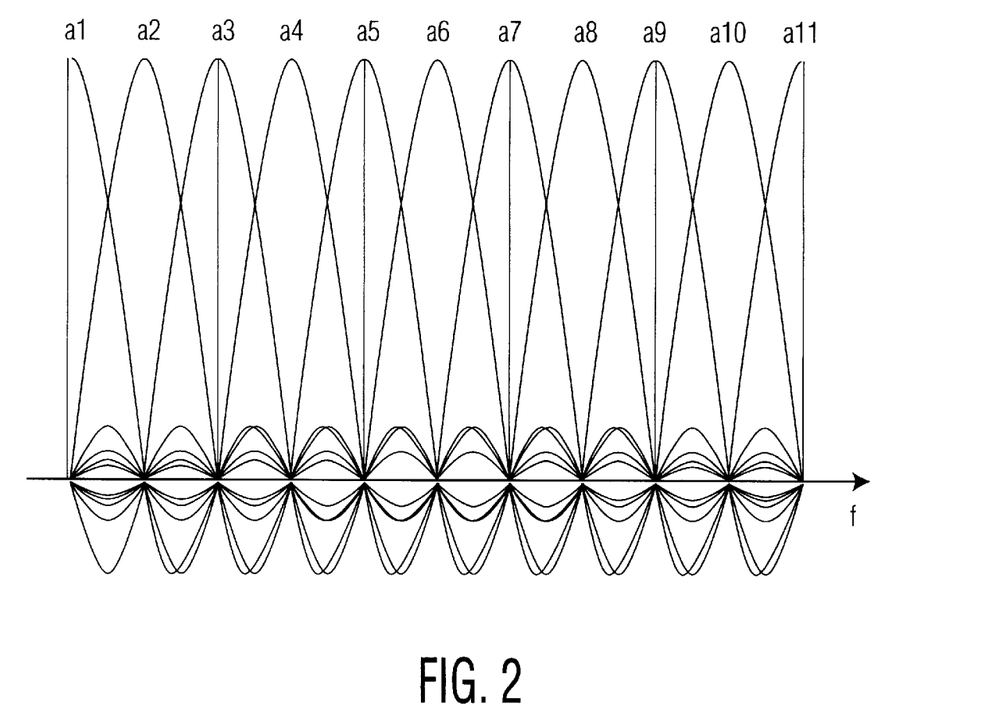
FIG. 2 shows the filter response corresponding to the 2N-FFT from FIG. 1.

FIG. 2 shows the filter response of the 2N-FFT. One item of carrier information contains only every other coefficient. As has already been described with respect to FIG. 1, for the FFT this means that only this half of the coefficients need be calculated while the other half, in contrast, need not be considered. The filter response has the form of a $\sin(x)/(2Nx)$ function for each carrier. Each function thus corresponds to a filter which passes one of the N carriers without losses while, on the other hand, filtering the others out from the signal. The absolute maximum of each function in this case corresponds to the zero crossings of the other filters. The maxima of the filters are at a reduced interval of $f_{tr}/2$ and the number of filters is twice as great as in the case of an N-FFT. In particular, the pass bands of the respective filters are only half as wide as for an N-FFT. This produces an improvement in the signal-to-noise ratio since:

if white noise is present, only half the noise power per carrier is integrated, in comparison with the conventional case. This leads to a 3 dB improvement in the signal-to-noise ratio.

and if a harmonic jammer occurs in the region of a filter maximum, in which there is no carrier present, even this interference element is completely filtered out from the wanted signal.

The use according to the invention of Nyquist windowing for carrier separation is shown in FIG. 3. The existing symbol of duration $T_s$ is lengthened by the time $T_v$, it being possible to vary $T_v$ as required, and being a part of the guard interval $T_g$ ($T_v<T_g$) where, for example, $T_g/T_s$ 1:4. In particular, if the transmission has only short echoes, $T_v$ can be selected to be appropriately long. The sample $b_{r+1}, b_{r+2}, \ldots b_{2N-r}$ are obtained by sampling the wanted symbol $T_s$ and the symbol extension $T_v$. The values $b_1, b_2, \ldots, b_r$ and $b_{2N-r}, \ldots b_{2n}$ are equal to zero. The new symbol $S_n$ thus obtained is made up as follows:

New symbol=zeros+old symbol+symbol extension+ zeros.

Figure 3A:
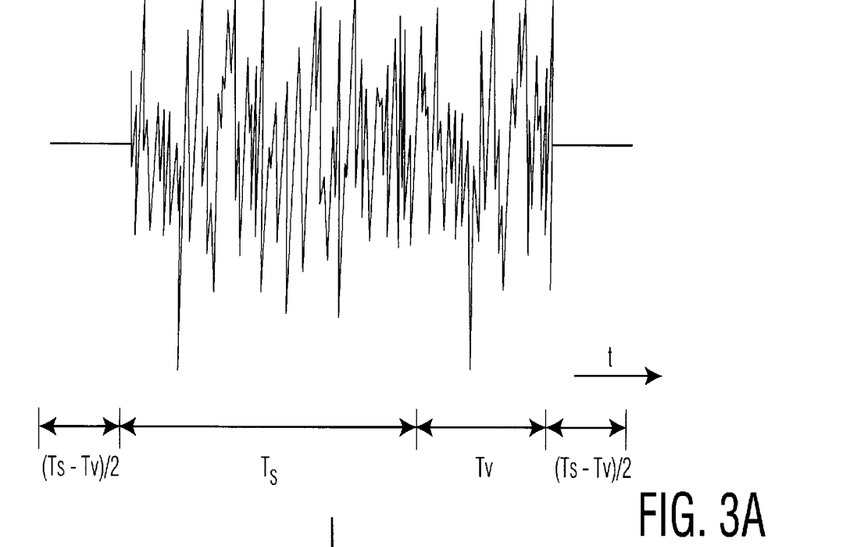

According to FIG. 3A, the duration of the new symbol is thus given by:

$$(T_s-T_v)/2+T_s+T_v+(T_s-T_v)/2=2T_s$$

Figure 3B:
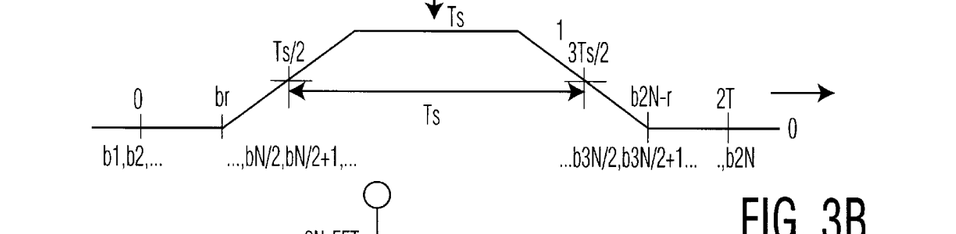
Figure 3C:
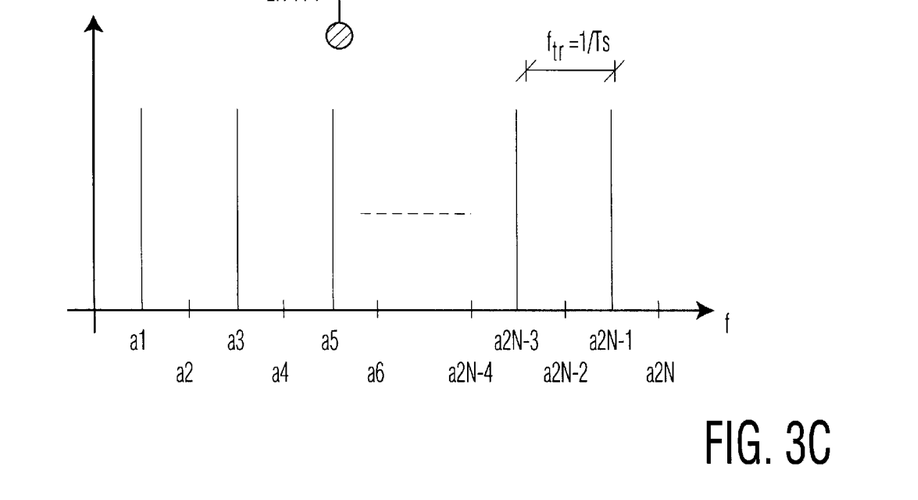

A Nyquist window can thus be used which is symmetrical about the symbol centre. The windowing can be designed, for example, as a cosine roll-off, although other Nyquist windows (triangular, trapezoidal and others) can likewise be used. The "Nyquist time" by analogy with the Nyquist frequency, is $1/2T_s$ and $3/2T_s$, as is illustrated in FIG. 3B. All 2N samples are transformed using a 2N-FFT, in order to obtain 2N coefficients. However, once again, as is shown in FIG. 3C, only half the coefficients are calculated.

Figure 4A:
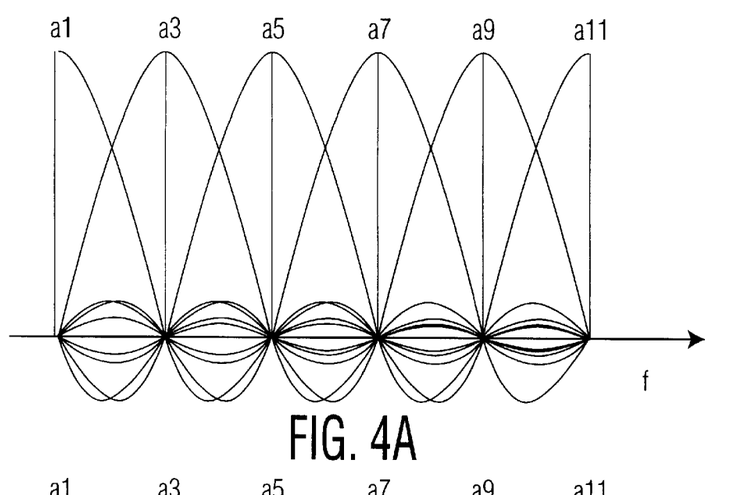
FIG. 4 shows the filter response, corresponding to the 2N-FFT, for various roll-off factors.
Figure 4B:
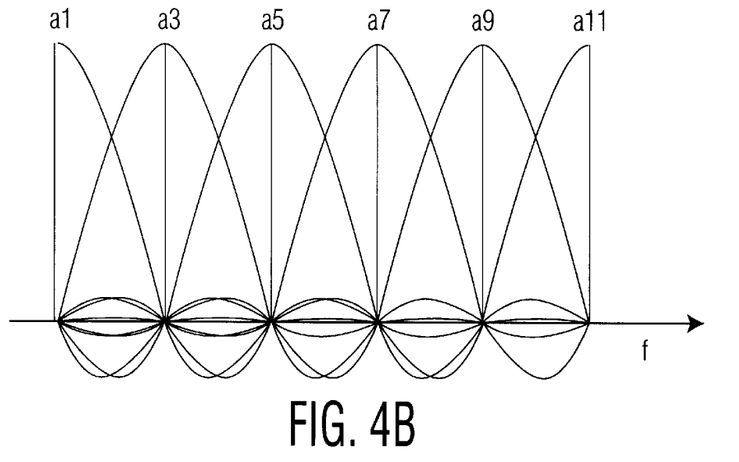
Figure 4C:
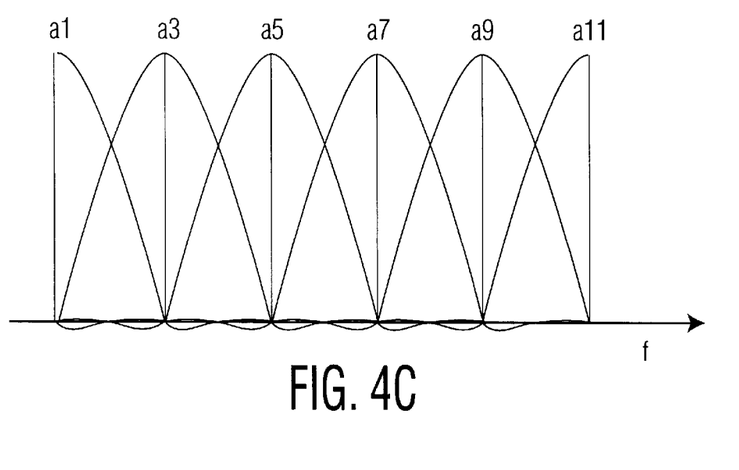

FIG. 4 shows the filter response of the 2N-FFT with Nyquist windowing. Once again, there are twice as many filters as in the case of an N-FFT, the carrier information being contained in the coefficients $a_1, a_3, a_5, a_7, \ldots a_{2N}$.

Since the remaining coefficients need not be considered, they and the corresponding even-numbered order filters are not illustrated in the Figure, in order to improve clarity. As a result of the Nyquist windowing (FIG. 4C), that is to say cosine roll-off equal to 1, the overshoots of the filter function decay much earlier than in the case of a cosine roll-off equal to 0.5 (FIG. 4B), or a rectangular window (FIG. 4A), corresponding to a cosine roll-off equal to 0.

The Nyquist windowing thus has the following advantages:

Improvement in the signal-to-noise ratio by up to 1.2 dB in the presence of white noise, depending on the selected roll-off factor.

Reduction in the signal-to-noise ratio if a discrete jammer is present in the wanted band, the relevant carriers being disturbed to a lesser extent and adjacent carriers being influenced to a lesser extent.

Improvement in the signal-to-noise ratio if a frequency error or phase noise is present.

Figure 5A:
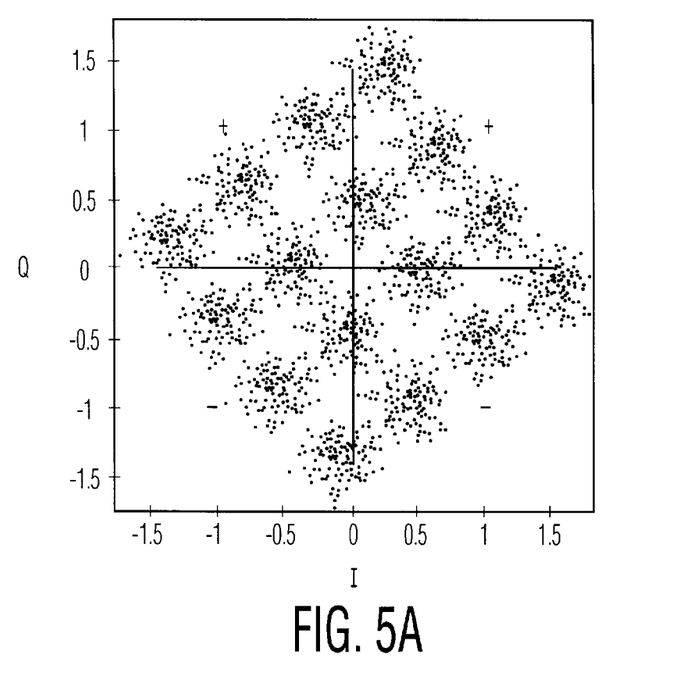
Figure 5B:
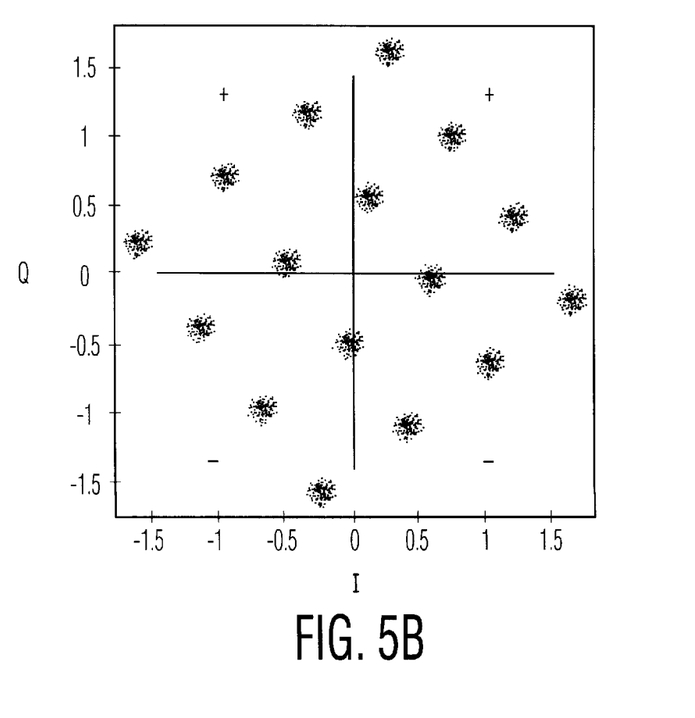

The improvement in the signal-to-noise ratio can be seen from FIG. 5, using the example of the occurrence of frequency errors. Vector diagrams for a conventional N-FFT (A) and a 2N-FFT according to the invention, with Nyquist windowing and roll-off =1 (B) are compared in this Figure, for a 16QAM using 2048 carriers. Each point in the diagrams in this case corresponds to one carrier. A considerable scatter of the carriers around the respective reference values can be seen for the conventional N-FFT, and this scatter reduces noticeably for the method according to the invention.

Figure 6A:
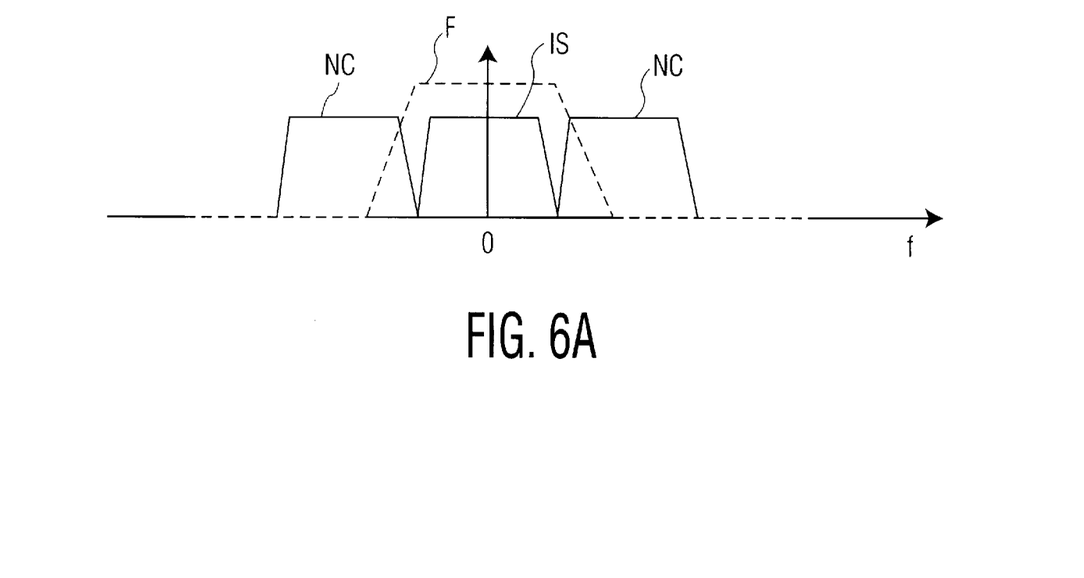
FIG. 6 shows the adjacent channel filtering using slight analog filtering (at the top), oversampling and formation of a 2N-FFT (at the bottom)
Figure 6B:
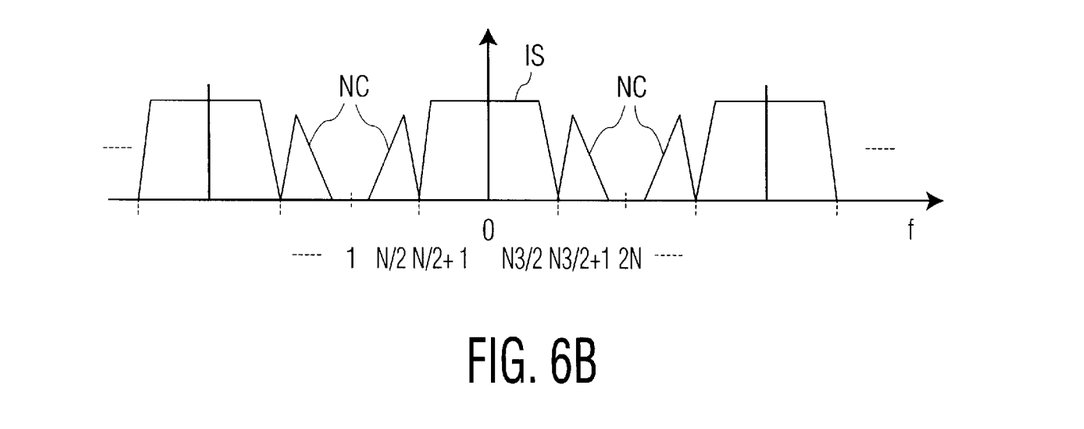

The adjacent channel filtering according to the invention is explained in FIG. 6. The wanted signal channel IS and the adjacent channels NC are in this case directly adjacent to one another. The OFDM wanted signal is selected in base-band using an anti-aliasing filter, relatively simple analog filtering, and is then sampled. The dotted line F in this case shows the frequency characteristic of the filtering. The signal is subsequently converted using simple oversampling A/D. An FFT of length 2N is formed from the oversampled signal. The N coefficients 1 to N/2 and N3/2+1 to 2N do not contain any wanted information, but the interference from the adjacent channels. These coefficients therefore need not be calculated, so that the complexity of the 2N-FFT is considerably simplified. In contrast, the N coefficients N/2+1 to N3/2 contain the wanted information and are used for further processing. This filtering by means of oversampling and doubling the FFT is adequate for an OFDM adjacent signal whose power corresponds to that of the wanted signal. However, if it is desired to reduce the effect of the leakage effect and thus to increase the filtering effect, the channel filtering can be combined with the windowing described above. The windowing now requires that the number of FFT coefficients be doubled once again, but without oversampling once again, so that 4N samples are produced. However, the complexity of the 4N-FFT is only slightly greater than that of an N-FFT in this case since only a quarter of the coefficients need be calculated to the end.

Figure 7:
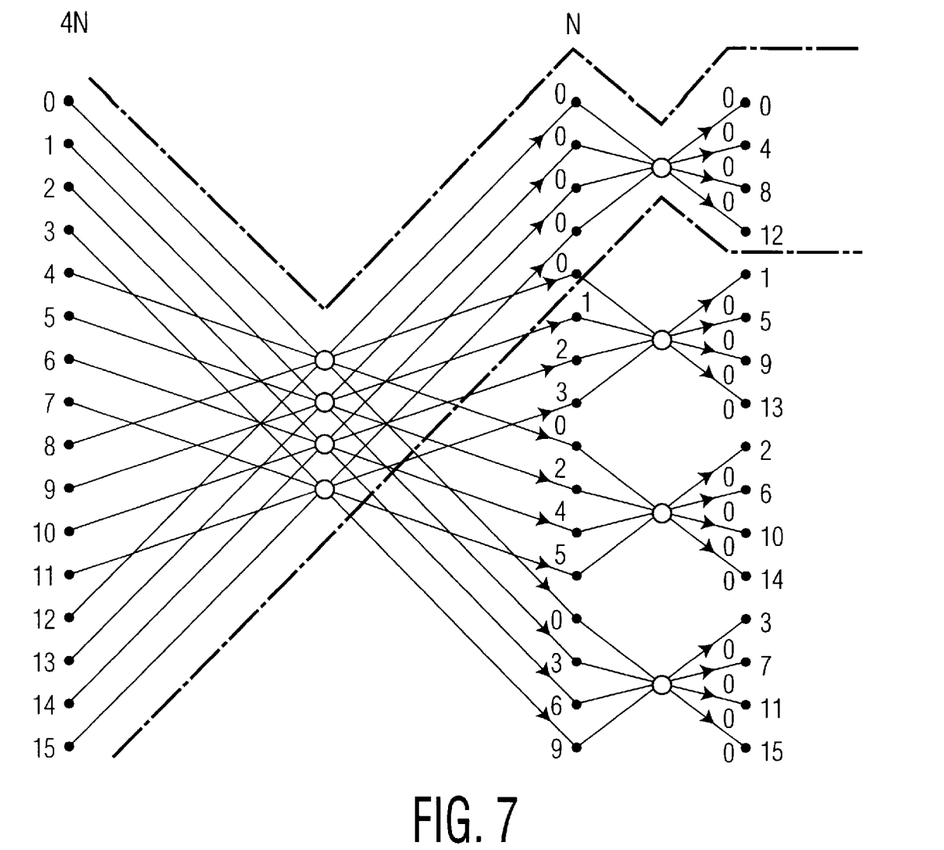
FIG. 7 shows the simplification of a 4N-FFT to form an N-FFT using a 4-radix algorithm.

Thus, for example, when using a 4-radix algorithm for calculation of the 4N-FFT, the complexity after the first complex multiplications is equal to that of an N-FFT. This is illustrated in FIG. 7 for a simple example where N=16. The original Fourier transformation using N=16 is in this case split, in the first stage of the FFT, into a linear combination of four Fourier transformations each using N=4 (open circles) in order to reduce the time penalty incurred, by reducing the multiplication operations. Only one of these N=4 Fourier transformations now need be calculated, as is indicated by the dashed region, since only every fourth coefficient is required.

Figure 8:
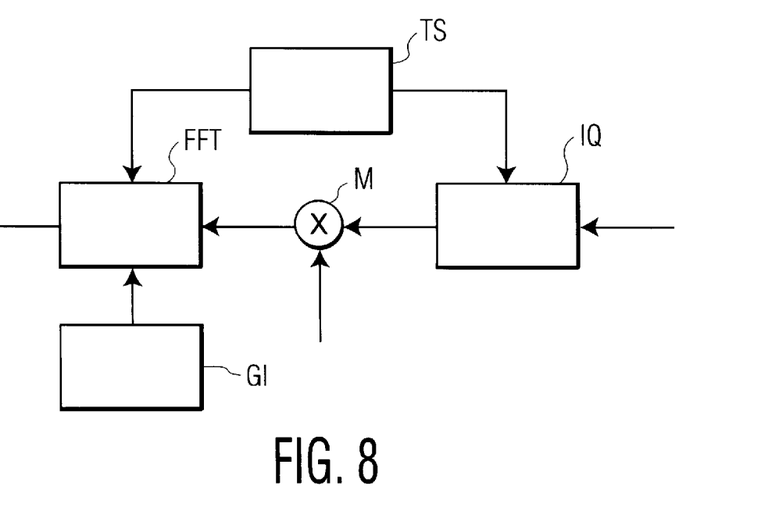
FIG. 8 shows a block diagram of a circuit arrangement according to the invention.

FIG. 8 shows a block diagram of a circuit arrangement according to the invention. After the transmitted OFDM signal has been converted to base-band, the digital signals are fed to a first unit IQ in which the transmitted OFDM signals are sampled with the aid of an A/D converter. In addition, in the case of the method for improving carrier separation, this unit contains a digital filter (FIR filter) for producing I/Q signals. When the method for improving channel separation is carried out, the FIR filtering can be dispensed with as a result of the OFDM signal being oversampled in the A/D converter, which results in $M_2*N$ samples. Frequency matching of the I/Q signals is now carried out with the aid of a frequency mixing unit M, before separation of the carrier frequencies is carried out in a processor FFT. A Fast Fourier Transformation is carried out for this purpose, windowing with time windows of duration $M_1*T_s$ and symbol lengthening to a symbol length of $M_1*T_s$ being carried out in order to improve the carrier separation. The length of the FFT is matched to the symbol length and/or to any oversampling carried out and is thus $M_1*N$, $M_2*N$ or, if both methods are carried out at the same time, $M_1*M_2*N$. Only the $1/M_2$-, $1/M_2$- or the $1/(M_1*M_2)$th fraction of the coefficients is accordingly calculated in the processor. In order to produce the new symbols, the current maximum usable length of the guard intervals is reported by a detector unit GI to the processor FFT, which detector unit GI uses the received OFDM signal in a known manner to determine the length of the echoes and of the guard intervals. The conversion unit IQ and the processor FFT are synchronized by means of a synchronization unit TS.

The invention can be used, for example, in DAB decoders or digital terrestrial television.

What is claimed is:

1. Method for improving reception in the transmission of digital signals comprising the steps of:

decomposing the digital signals into symbols of duration $T_s$;

assigning a guard interval to each symbol;

distributing the symbols over N different carrier frequencies;

taking the Fourier transform of the transmitted signal in a receiver wherein after sampling of the signal;

multiplying with time windows of width $M_1*T_s$, where $M_1$ is greater than 1, takes place and the length of the Fourier transform is $M_1*N$ in the receiver for the transmitter symbols;

defining new symbols of duration $M_1*T_s$;

forming the new symbols from the transmitter symbols and a fraction of the guard intervals;

determining the current maximum useful length of the guard intervals in order to make it possible for the length of the guard-interval fractions used for forming the new symbols to be matched adaptively to the transmission conditions, and calculating every $M_1$-th coefficient by the Fourier transform.

2. Method according to claim 1, characterized in that:

the symbols are lengthened by the duration $T_v$, and lengthened symbols are thereby defined, samples before and after the lengthened symbols are set to zero, and the new symbols are thereby defined, the time windows are each formed by a Nyquist window and a region set to zero.

3. Method according to claim 2, characterized in that:

the number of samples which are set to zero is selected in such a way that the duration of the new symbols is in each case $2*T_s$, the Nyquist window has the Nyquist points at $T_s/2$ and $3T_s/2$, the length of the Fourier transform is $2*N$, and only every 2nd coefficient is calculated by suitable selection of the FFT algorithm.

4. Method for improving reception in the transmission of digital signals, comprising the steps of:

oversampling of the signal being used to produce $M_2*N$ samples, where $M_2$ is greater than 1;

performing a Fourier transform of length $M_2*N$;

transmitting in a plurality of channels with N carrier frequencies being used per channel;

selecting one of the channels in a receiver, whereby fractions of the neighboring channels also being picked up during the channel selection, and the samples being produced by a signal consisting of said selected channel and said fractions of the neighboring channels;

calculating only the central N coefficients by the Fourier transform.

5. Circuit arrangement for improving reception of digital signals having:

processor in which separation of N carrier frequencies is carried out, for windowing with time windows of width $M_1 T_s$, where $M_1$ is greater than 1, and carrying out a Fourier transform of length $M_1*N$;

a first unit for sampling and converting into I/Q signals and to which the digital signals are fed in the receiver, a frequency mixing unit for frequency matching, and detector unit for determining the current maximum usable guard-interval length for producing the new symbols in order to make it possible for the length of the guard-interval fractions used for forming the new symbols to be matched adaptively to the transmission conditions in the receiver, new symbols of duration $M_1*T_s$ being produced and only every $M_1$-th coefficient being calculated through suitable selection of the FFT algorithm.

6. Circuit arrangement according to claim 5, characterized in that the first unit (IQ) consists of an A/D converter and a digital filter.

7. Circuit arrangement for improving reception of digital signals, having:

a first unit for sampling and converting into I/Q signals and to which the digital signals are fed in the receiver, a frequency mixing unit for frequency matching, and a processor (FFT) in which separation of N carrier frequencies is carried out;

a channel selection filter that for transmission in a plurality of channels, N carrier frequencies being used per channel also picking up fractions of neighboring channels, and a synchronization unit, the synchronization unit selecting the sampling rate in such a way that, during the sampling, $M_2*N$ samples are produced, where $M_2$ is greater than 1, and in that an FFT of length $M_2*N$ is taken in the receiver and only the central N coefficients are calculated by suitable selection of the FFT algorithm.

8. Method for improving reception in the transmission of digital signals, comprising the steps of:

decomposing the digital signals into symbols of duration $T_s$;

assigning a guard interval to each symbol;

distributing the symbols over N different carrier frequencies, oversampling of the signal to produce $M_2*N$ samples, where $M_2$ is greater than 1, and performing a Fourier transform of length $M_2*N$ after sampling of the signal;

multiplying with time windows of width $M_1*T_s$, where $M_1$ is greater than 1, takes place and the length of the Fourier transform is $M_1*N_1$, defining new symbols of duration $M_1*T_s$;

forming the new symbols from the transmitter symbols and a fraction of the guard intervals;

determining the current maximum useful length of the guard intervals in order to make it possible for the length of the guard interval fractions used for forming the new symbols to be matched adaptively to the transmission conditions;

calculating every $M_1$-th coefficient by the Fourier transform, and;

transmitting in a plurality of channels, N carrier frequencies being used per channel, and;

selecting one of the channels in a receiver, fractions of the neighboring channels also being picked up during the channel selection, and producing the samples by a signal consisting of said selected channel and said fractions of neighboring channels, and only the central N coefficients being calculated by the Fourier transform.

* * * * *